UNITED STATES PATENT OFFICE.

ATHELSTAN E. GOOCH, OF CAMPELLO, MASSACHUSETTS, ASSIGNOR TO THE ARABOL MANUFACTURING COMPANY, OF NEW YORK, N. Y., A CORPORATION OF NEW YORK.

COMPOSITION OF MATTER.

No. 898,044.

Specification of Letters Patent.

Patented Sept. 8, 1908.

Application filed June 12, 1907. Serial No. 378,657.

*To all whom it may concern:*

Be it known that I, ATHELSTAN E. GOOCH, a citizen of the United States, and a resident of Campello, in the county of Plymouth and State of Massachusetts, have invented a certain new and useful Composition of Matter, of which the following is a specification.

My invention relates to a new and useful composition of matter to be used as a reinforcing filler on the inner soles of shoes, especially welted shoes.

In its simplest form my composition consists of the following ingredients combined in the proportions stated viz:—

Ground cork 2 to 3 lbs.
Liquid starch glue 1 gallon.

These ingredients are thoroughly intermingled by agitation.

I prefer to use a liquid starch glue of the class known commercially as "apparatine" and preferably of a specific gravity of 1.2. Of course, the proportions set forth are variable within reasonable limits, the quantity of liquid starch glue depending upon the size and quality of the cork grains.

In using the above named composition, it is applied to the inner soles of shoes by suitable means such as a spatula, trowel or the like, and allowed to dry and harden. After about two hours, the mixture becomes hard and flexible, and when completely dry is not affected by moisture, but forms a hornlike elastic addition to the leather sole.

The use of liquid starch gums and glues together with ground cork, etc. provides a filler for the inner soles which is much cheaper than the present fillers used, and is in all respects their equal.

I am aware that rubber dissolved in bisulfid of carbon or in other solvents is used as a binder for the cork. Such rubber cements, however, are highly inflammable, disagreeable and dangerous to handle, and much more expensive than starch glues and the like, as set forth.

I claim:—

The herein described composition of matter, or filler, for reinforcing the leather soles of welted shoes, consisting of a mixture of ground cork 2 to 3 lbs., and apparatine 1 gallon, said mixture drying within a few hours when exposed to the air to form with said cork a hornlike, elastic addition to the leather soles.

Signed at Brockton in the county of Plymouth and State of Massachusetts this eighth day of June A. D. 1907.

ATHELSTAN E. GOOCH.

Witnesses:
B. FRANK HANSCOM,
A. L. MEGATHLIN.